United States Patent
Yaacob et al.

(10) Patent No.: US 11,158,286 B2
(45) Date of Patent: Oct. 26, 2021

(54) MACHINE LEARNING COLOR SCIENCE CONVERSION

(71) Applicant: Disney Enterprises, Inc., Burbank, CA (US)

(72) Inventors: Yazmaliza Yaacob, Los Angeles, CA (US); Nimesh C. Narayan, Los Angeles, CA (US); Kari M. Grubin, Woodland Hills, CA (US); Andrew J. Wahlquist, Downey, CA (US)

(73) Assignee: Disney Enterprises, Inc., Burbank, CA (US)

( * ) Notice: Subject to any disclaimer, the term of this patent is extended or adjusted under 35 U.S.C. 154(b) by 0 days.

(21) Appl. No.: 16/356,840

(22) Filed: Mar. 18, 2019

(65) Prior Publication Data

US 2020/0111447 A1 Apr. 9, 2020

Related U.S. Application Data

(60) Provisional application No. 62/742,165, filed on Oct. 5, 2018.

(51) Int. Cl.
*G09G 5/06* (2006.01)
*G06K 9/00* (2006.01)
(Continued)

(52) U.S. Cl.
CPC ........... *G09G 5/06* (2013.01); *G06K 9/00624* (2013.01); *G06N 20/00* (2019.01); *G06T 7/90* (2017.01);
(Continued)

(58) Field of Classification Search
CPC ........ G09G 5/06; G09G 2340/06; G06T 7/90; G06T 2207/20081; G06N 20/00; G06K 9/00624
See application file for complete search history.

(56) References Cited

U.S. PATENT DOCUMENTS 8,917,329 B1   12/2014  Woodman et al.
2004/0252238 A1  12/2004  Park et al.
(Continued)

FOREIGN PATENT DOCUMENTS

WO   WO2020061172   *  3/2020  ............... G06T 5/00
WO   WO2020132371   *  6/2020  ... G06T 2207/20208

OTHER PUBLICATIONS

Nazeri et al., "Image Colorization with Generative Adversarial Networks," LNCS 10945 (2018) 85-94.
(Continued)

*Primary Examiner* — Phuc N Doan
(74) *Attorney, Agent, or Firm* — Patterson + Sheridan, LLP

(57) ABSTRACT

Techniques are disclosed for converting image frames from one color space to another while predicting artistic choices that a director, colorist, or others would make. In one configuration, a color conversion application receives image frames, an indication of color spaces to convert between, and metadata associated with the image frames and/or regions therein. The conversion application determines a global, base color conversion for the image frames using a predefined color space transformation. Then, the conversion application (optionally) extracts image regions depicting objects of interest in the image frames, after which the color conversion application processes each of the extracted image regions and the remaining image frames (after the extracted regions have been removed) using one or more functions determined using machine learning. The processed extracted regions and remainders of the image frames are then combined by the color conversion application for output.

21 Claims, 5 Drawing Sheets

(51) Int. Cl.
*G06N 20/00* (2019.01)
*G06T 7/90* (2017.01)

(52) U.S. Cl.
CPC .............. *G06T 2207/20081* (2013.01); *G09G 2340/06* (2013.01)

(56) References Cited

U.S. PATENT DOCUMENTS

| | | |
|---|---|---|
| 2006/0177110 A1 | 8/2006 | Imagawa et al. |
| 2007/0211074 A1* | 9/2007 | Yeung .................. H04N 1/6052 345/604 |
| 2008/0159605 A1* | 7/2008 | Ramsay .................. G06K 9/00 382/128 |
| 2009/0051819 A1 | 2/2009 | Hasegawa |
| 2009/0174726 A1* | 7/2009 | Ollivier ................ H04N 1/6011 345/600 |
| 2010/0128181 A1 | 5/2010 | Jagmag |
| 2012/0045095 A1* | 2/2012 | Tate ........................ G06T 5/003 382/103 |
| 2013/0279802 A1* | 10/2013 | van der Merwe . G06K 9/00362 382/165 |
| 2014/0022460 A1* | 1/2014 | Li .......................... H04N 17/02 348/708 |
| 2014/0172643 A1* | 6/2014 | Fazl Ersi ............ G06F 16/5854 705/26.64 |
| 2014/0253545 A1* | 9/2014 | Sullivan ................ G06T 11/001 345/419 |
| 2014/0280258 A1* | 9/2014 | Nicholas ............... G06F 16/258 707/756 |
| 2015/0139603 A1 | 5/2015 | Silverstein et al. |
| 2015/0207960 A1* | 7/2015 | Tomlinson .............. G06T 7/246 382/167 |
| 2016/0198142 A1* | 7/2016 | San Drew ........... G11B 27/031 386/278 |
| 2016/0261772 A1* | 9/2016 | Mcelvain ................ H04N 1/60 |
| 2016/0307602 A1* | 10/2016 | Mertens ............... G11B 27/031 |
| 2017/0076438 A1* | 3/2017 | Kottenstette ....... G06K 9/00637 |
| 2017/0127127 A1* | 5/2017 | Zavesky .................... G06T 5/50 |
| 2017/0228137 A1 | 8/2017 | Carlos et al. |
| 2017/0236407 A1* | 8/2017 | Rhoads ............. G06K 9/00664 455/420 |
| 2018/0040153 A1 | 2/2018 | Tanigawa et al. |
| 2018/0241929 A1* | 8/2018 | Bouzaraa .............. H04N 5/2355 |
| 2019/0052908 A1* | 2/2019 | Mertens .................... G09G 5/10 |
| 2020/0051217 A1* | 2/2020 | Shen ........................ G06N 3/04 |
| 2020/0051260 A1* | 2/2020 | Shen ......................... G06T 7/44 |
| 2020/0175337 A1 | 6/2020 | Ho et al. |
| 2020/0184620 A1 | 6/2020 | Biernacki |

OTHER PUBLICATIONS

U.S. Appl. No. 16/360,944, Entitled "Aspect Ratio Conversion with Machine Learning", filed Mar. 21, 2019.

* cited by examiner

MACHINE LEARNING COLOR SCIENCE CONVERSION

CROSS-REFERENCE TO RELATED APPLICATIONS

This application claims benefit of U.S. provisional patent application Ser. No. 62/742,165, filed Oct. 5, 2018, which is herein incorporated by reference in its entirety.

BACKGROUND

Field of the Disclosure

Aspects presented in this disclosure generally relate to color conversion.

Description of the Related Art

Colors have been used in motion pictures to convey emotions and different elements of a scene. Color conversion is required to adjust image frames to different display environments, such as converting from the theatrical P3 (DCI) color space to the in-home Rec. 709 (BT. 709) color space with a constrained set of colors relative to the P3 color space, or from the Rec2020 color space to the P3 D65 color space. Traditionally, color conversions have required a director, colorist and/or others to manually decide on the brightness, saturation, image adjustments, etc. needed to create a representation of image frames in another color space. Such a manual color conversion process, which is also sometimes referred to as a "trim pass," can be labor intensive and time consuming. This is particularly the case with the proliferation of new display technologies that support different color spaces, necessitating ever more color conversions.

SUMMARY

One aspect of this disclosure provides a computer-implemented method for converting image frames from a first color space to a second color space. The method generally includes receiving one or more image frames represented in the first color space, the one or more image frames being associated with corresponding metadata. The method further includes, for each image frame of the one or more image frames: converting the image frame from the first color space to the second color space by processing the image frame and at least a portion of the corresponding metadata associated with the image frame using at least one function determined using machine learning.

Other aspects include, without limitation, a computer-readable medium that includes instructions that enable a processing unit to implement one or more aspects of the disclosed method, as well as a system configured to implement one or more aspects of the disclosed method.

BRIEF DESCRIPTION OF THE DRAWINGS

So that the manner in which the above recited aspects are attained and can be understood in detail, a more particular description of aspects of this disclosure, briefly summarized above, may be had by reference to the appended drawings.

It is to be noted, however, that the appended drawings illustrate only typical aspects of this disclosure and are therefore not to be considered limiting of its scope, for the disclosure may admit to other equally effective aspects.

DETAILED DESCRIPTION

Figure 1:
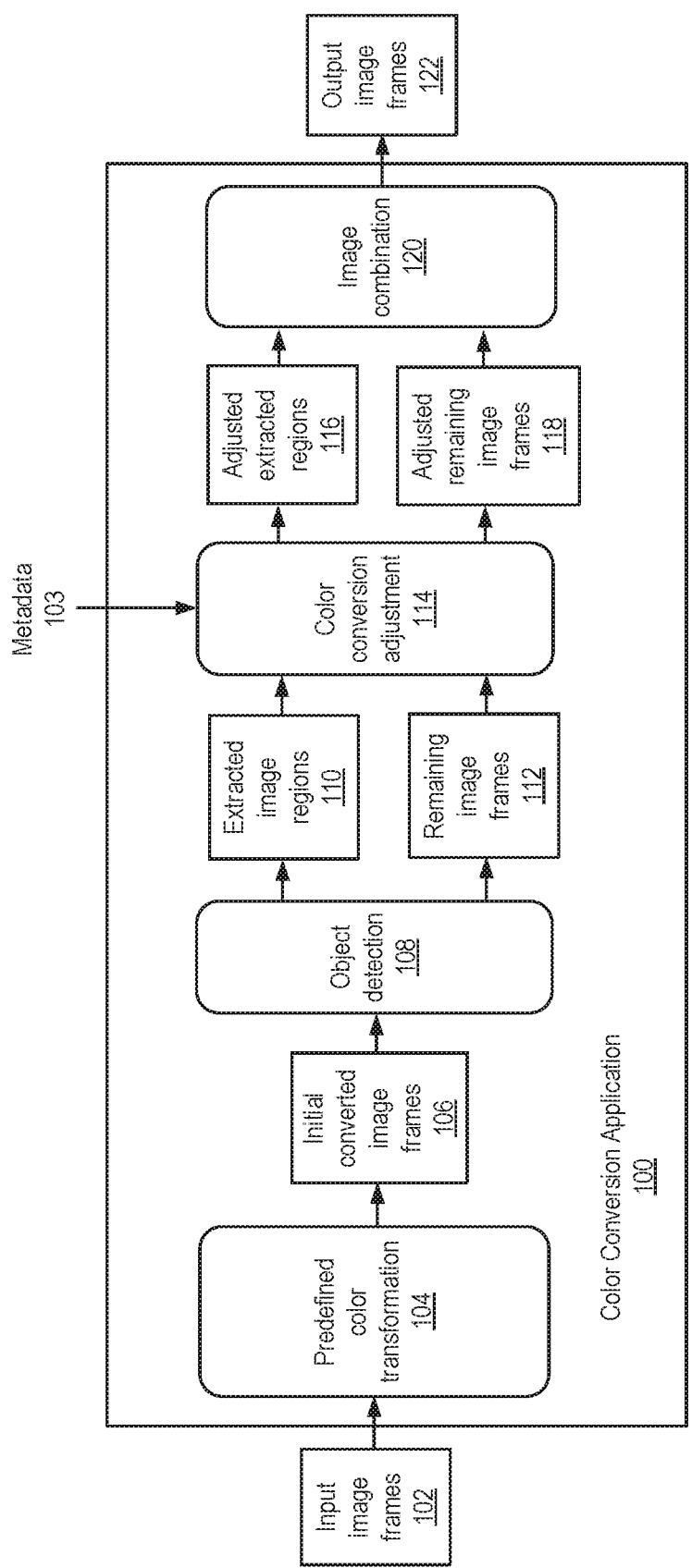
FIG. 1 illustrates an approach for converting image frames between color spaces, according to an aspect of this disclosure.

Aspects presented herein provide an approach for automatically converting images from one color space to another while predicting the artistic choices that a human operator would make. In one configuration, a color conversion application receives image frames of a video, associated metadata, and an indication of color spaces to convert between. The received metadata may include metadata that is associated with all of the image frames of the video, or with particular shots, image frames, or objects therein. For example, the metadata may include (1) technical metadata indicating camera lenses used to capture the image frames, whether the image frames depict digital or film images, whether the image frames depict live action or animated content, a year, etc.; (2) metadata indicating image characteristics such as day or night, bright or dark, contrast, saturation, grain, sharpness, etc.; (3) metadata indicating objects (e.g., characters, creatures, props, environments, etc.) that have been automatically recognized or manually tagged in the image frames; and/or (4) creative metadata indicating, e.g., a colorist, director, brand, genre, film company, episodic series, franchise, etc. associated with the image frames. Given the received image frames, the associated metadata, and the indication of the color spaces to convert between, the color conversion application determines a global, base color conversion for the image frames using a predefined color space transformation, which does not account for the associated metadata. The color conversion application then (optionally) identifies objects of interest in each image frame, which would traditionally be windowed out and converted separately by hand, and the color conversion application extracts image regions depicting such objects of interest. After extracting the image regions depicting objects of interest, the color conversion application processes each of the extracted image regions and the remaining image frames (after the extracted regions have been removed) using one or more functions determined using machine learning. Each of the function(s) may include rule(s) and/or model(s) for mapping an input to an output. For example, the input may include an image (e.g., an extracted image region or remaining image frame after a base conversion has been applied), information from metadata associated with the image, and/or other information derived therefrom, and the output may include another image with colors predictive of what a human operator would have chosen, specific adjustments to make (to the brightness, saturation, etc.), or a particular mapping between colors to apply. Then, the color conversion application combines for output the processed extracted image regions and remaining image frames.

In the following, reference is made to aspects of the present disclosure. However, it should be understood that this disclosure is not limited to specific described aspects. Instead, any combination of the following features and elements, whether related to different aspects or not, is contemplated to implement and practice the aspects disclosed herein. Furthermore, although aspects may achieve advantages over other possible solutions and/or over the prior art, whether or not a particular advantage is achieved by a given aspect is not limiting of this disclosure. Thus, the following aspects, features, configurations and advantages are merely illustrative and are not considered elements or limitations of the appended claims except where explicitly recited in a claim(s). Likewise, reference to "the aspect" shall not be construed as a generalization of any inventive subject matter disclosed herein and shall not be considered to be an element or limitation of the appended claims except where explicitly recited in a claim(s).

As will be appreciated by one skilled in the art, aspects of the present disclosure may be embodied as a system, method or computer program product. Accordingly, aspects of the present disclosure may take the form of an entirely hardware configuration, an entirely software configuration (including firmware, resident software, micro-code, etc.) or a configuration combining software and hardware aspects that may all generally be referred to herein as a "circuit," "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described below with reference to flowchart illustrations and/or block diagrams of methods, apparatus (systems) and computer program products according to aspects of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Aspects of the present disclosure may be provided to end users through a cloud computing infrastructure. Cloud computing generally refers to the provision of scalable computing resources as a service over a network. More formally, cloud computing may be defined as a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

Typically, cloud computing resources are provided to a user on a pay-per-use basis, where users are charged only for the computing resources actually used (e.g. an amount of storage space consumed by a user or a number of virtualized systems instantiated by the user). A user can access any of the resources that reside in the cloud at any time, and from anywhere across the Internet. In context of the present disclosure, a user may access applications (e.g., a color conversion application) or related data available in the cloud. For example, the color conversion application could execute on a computing system in the cloud and convert received image frames from one color space to another according to techniques disclosed herein and store the converted image frames at a storage location in the cloud. Doing so allows a user to access this information from any computing system attached to a network connected to the cloud (e.g., the Internet).

Referring now to FIG. 1, an approach is shown for converting image frames between color spaces, according to an aspect of this disclosure. As shown, a color conversion application 100 includes a predefined color space transformation module 104, an (optional) object detection module 108, a color conversion adjustment module 114, and an image combination module 120. The color conversion application 100 receives image frames 102 of a video represented in one color space and associated metadata 103 (as well as a specification of color spaces to convert between) as input. For example, the image frames 102 may be an original version of the image frames created by a director of a film or episodic series episode, and such image frames may be represented in a color space with a relatively wide gamut, or "footprint," of colors (e.g., the theatrical DCI-P3 or Rec2020 color space). The color conversion application 100 converts the received image frames 102 into one or more additional versions of the image frames 122 represented in other color spaces that may be used by various displays (e.g., in-home as opposed to theatrical), essentially reinterpreting and optimizing the image frames 102 for those types of displays. Where the original color space of the image frames 102 has a wider gamut of colors than the color space of the converted image frames 122, each converted version of the image frames is a derivation that removes, rather than adds, color information.

The predefined color space transformation module 104 is responsible for applying to the input image frames 102 a predefined, global color space transformation from a color space of the input image frames 102 to an output color space, which may be user-specified. Such a predefined color space transformation is also referred to herein as the "base color conversion." In one configuration, the predefined color space transformation may use a lookup table (LUT) in the form of a matrix that takes each color in the color space of the input image frames 102 to a corresponding color in the output color space. In an alternative configuration, the predefined color space transformation may be in the form of a mathematical algorithm for performing color conversion in the color space transformation language (CTL) set by the Motion Picture Association of America (MPAA) Academy Color Encoding System (ACES) project. For example, the predefined color space transformation may be used to convert colors from the theatrical DCI-P3 color space to the in-home Rec. 709 color space, or from the Rec2020 color space to the P3 D65 color space. It should be understood that the predefined color space transformation is used to perform a generic conversion to the output color space and does not attempt to predict the color conversion decisions that any particular director, colorist, or others would make. However, the predefined color space transformation may provide a reasonable first-pass conversion that can be adjusted to be predictive of the color conversion decisions a human operator would make using function(s) determined using machine learning, as discussed in greater detail below.

The object detection module 108 is responsible for identifying objects of interest, requiring separate color conversion adjustments, that appear in the initial converted images 106 and extracting image regions 110 depicting the identified objects of interest from the initial converted images 106. Any feasible technique may be used to identify the objects of interest and extract the image regions 110 depicting the same, and the identified objects may include, e.g., characters, creatures, props, and/or environments. In one configuration, one or more machine learning models (e.g., convolutional neural network(s), support vector machine(s), etc.) may be trained to perform image segmentation in which pixels of an input image are classified as belonging to certain objects of interest (or not) that require separate color conversion adjustments from the rest of the input image. For example, in the case of a convolutional neural network (CNN), which may include a number of feature extraction layers such as convolutional and pooling layers as well as fully connected layers that make predictions based on features extracted by the feature extraction layers, the CNN may be trained using labeled training data to segment an image into regions depicting classified objects of interest. As an example of an object of interest, a character's shield may be distinctive in a movie franchise and, traditionally, require a director or colorist to window out the shield for separate color conversion. In such a case, a CNN may be trained, using labeled example images depicting the shield (and perhaps negative example images that do not depict the shield), to segment an input image into regions that do and do not depict the shield. The object detection module may then process the initial converted images 106 using such a trained machine learning model to extract image regions depicting the shield in those images 106 for separate color conversion. As another example, metallic objects in general may need to be colored differently than other objects in a scene, and a machine learning model may be trained and thereafter used to extract image regions depicting metallic objects.

As shown, the extracted image regions 110 and the remaining image frames 112, which are the initial converted images 106 after the image regions 110 have been removed, are processed by the color conversion adjustment module 114. The color conversion adjustment module 114 utilizes predictive techniques to determine output pixel color values given the input extracted image regions 110 and remaining image frames 112, as well as associated metadata, and the conversion adjustment module 114 outputs adjustments to the extracted image regions 110 and remaining image frames 112, shown as adjusted extracted regions 116 and adjusted remaining image frames 118.

Figure 2:
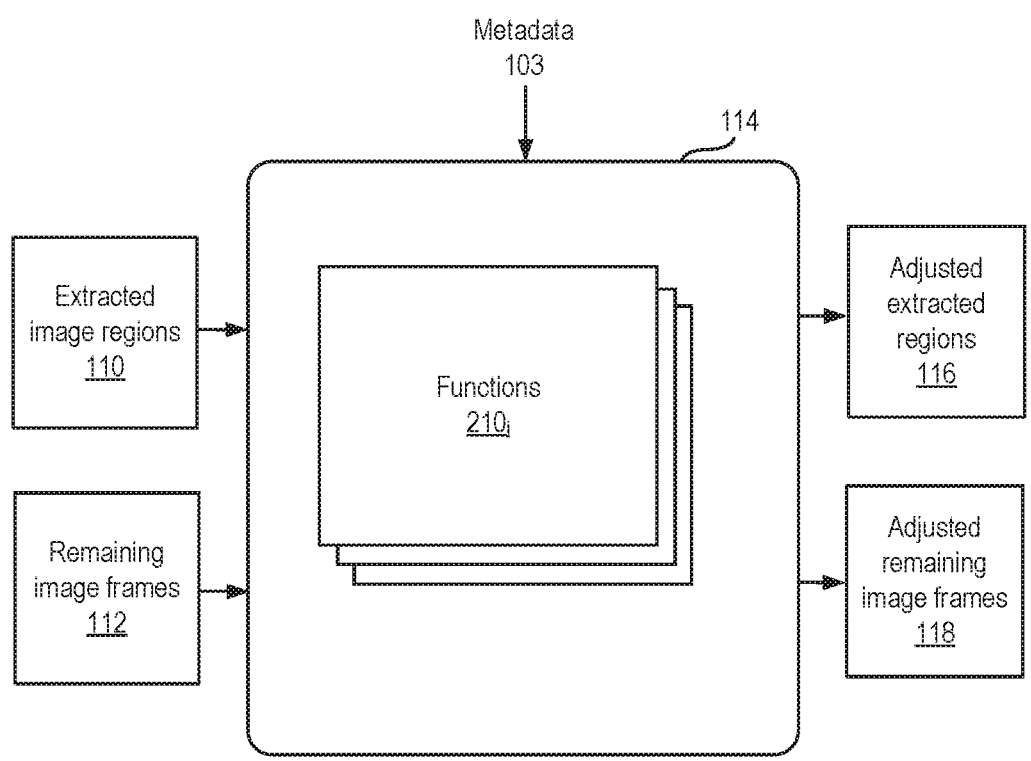
FIG. 2 illustrates an approach for determining an adjustment to a base color conversion, according to an aspect of this disclosure.

FIG. 2 illustrates the color conversion adjustment module 114 in greater detail, according to an aspect of this disclosure. As shown, the color conversion adjustment module 114 includes one or more functions $210_i$ that are used to adjust the extracted image regions 110 and remaining image frames 112 to produce the adjusted image regions 116 and adjusted remaining image frames 118. Each of the function(s) may include one or more rules and/or models that are trained using machine learning techniques to map an input to an output, as well as (optional) user-defined rules. For example, the input may include an image (e.g., an extracted image region or remaining image frame), information specified in associated metadata, and/or other information derived from the image or associated metadata, which are also sometimes referred to herein as the input features. The function may then output an adjusted image with different pixel colors, or specific adjustments such as to brightness, saturation, etc. or a specific color mapping that may be applied to the image to adjust it (in the form of, e.g., a LUT or CTL algorithm). Although rules and models are sometimes discussed herein as being distinct, in some configurations, the models may themselves include rules. In other configurations, only rules or only models may be used. That is, the color conversion adjustment module 114 may generally utilize any suitable rule(s) and/or model(s).

In some configurations, the function(s) $210_i$ may include rules that solve the regression problem of predicting adjustments to a base color conversion when images are converted from one color space to another. Such rules may be in any suitable form. In one configuration, the function(s) $210_i$ may include if-then rules in a knowledge-based system or variant thereof. In such a case, the rules may be stored in a knowledge base along with facts relating to historical manual color conversions of image frames, and an inference engine may apply the stored rules to make color conversion adjustments to the extracted image regions 110 and remaining image frames 112 after a base conversion has been applied. When the color conversion adjustment module 114 receives the extracted image regions 110 and the remaining image frames 112 along with associated metadata, the inference engine 204 selects and applies the appropriate rules for adjusting the base conversion of the extracted image regions 110 and the remaining image regions 112 from the input to the output color spaces, in order to predict the output color values, specific adjustments a user would make such as adjustments to brightness, saturation, image, etc., or a mapping from base conversion colors to adjusted colors. For example, one stored rule may specify that if the director is A, the genre is B, and the brightness is above a certain threshold (indicating, e.g., a daytime scene), then the brightness and saturation of an input image should be adjusted by particular percentages or a particular mapping between colors should be applied. In this example, the director, genre, and brightness are features that may be determined from the image itself and/or associated metadata. Features are properties and/or characteristics of data that may be used (1) during a training phase along with examples of desired output, which is also sometimes referred to as labeled data, to obtain one or more rules and/or models via machine learning, and (2) during an inference phase to make predictions with the rules and/or models given new data. Each desired feature may be determined from the image frames themselves or from associated metadata, which may provide certain features and/or information from which features may be derived. As described, the metadata may include technical metadata such as metadata indicating camera lenses used to capture the image frames, whether the image frames depict digital or film images, whether the image frames depict live action or animated content, a year, etc.; metadata indicating image characteristics such as day or night, bright or dark, contrast, saturation, grain, sharpness, etc.; metadata indicating objects (e.g., characters, creatures, props, environments, etc.) that have been automatically recognized or manually tagged in the image frames; and/or creative metadata indicating, e.g., a colorist, director, brand, genre, film company, episodic series, franchise, etc. Whether the image frames depict day or night, bright or dark, etc. are also referred to herein as the nature of a scene being depicted. The metadata may be determined in any technically feasible manner, by the color conversion application 100 itself and/or other application(s), and/or specified manually by a user. For example, the creative information such as the director, brand, genre, film company, episodic series, franchise, etc. may be queried from a database storing such information. As another example, automated techniques are known for predicting the time of day of a scene, which may be used to determine whether a daytime or nighttime scene is depicted in an image.

Further, the stored rules may include rules that are learned in any technically feasible manner, such as using rule-based machine learning techniques. A rule that is not predictive of historical manual color conversions may be discarded, or its parameter values changed, through the machine learning process. The stored rules may also include user-defined rules used to check automatically determined color conversions, as discussed in greater detail below.

In another configuration, the rules may include rules formed by paths from the root node to the leaf nodes of a decision tree or variant thereof, which may also be considered a model. A decision tree is a tree-like model with internal nodes representing tests of feature values, leaves specifying classification or regression outputs, and branches for different values of the feature at each node. For example, one rule in a decision tree may specify, similar to the rule described above with respect to the knowledge-based system, that if the director is A, the genre is B, and the brightness is above a threshold value (indicating, e.g., a daytime scene), then the brightness and saturation of an image should be adjusted by particular percentages or a particular mapping between colors should be applied. Another rule in such a decision tree may specify that if the director is A, the genre is B, but the brightness is below the threshold value (indicating, e.g., a nighttime scene), then the brightness and saturation of an image should be adjusted by other percentages or another mapping between colors should be applied. A decision tree that produces outputs indicating adjustments to make (to the brightness, saturation, etc.), or mappings between colors to apply, based on input features, such as information specified in the technical metadata, image characteristics metadata, objects metadata, and/or creative metadata described above and/or features extracted directly from the image, may be learned via any suitable decision tree algorithm based on historical examples of manual adjustments made to base color conversions. Examples of algorithms that may be used to learn decision trees include ID3 (Iterative Dichotomiser 3), C4.5, CART (Classification and Regression Tree), CHAID (Chi-squared Automatic Interaction Detector), and MARS (Multiple Adaptive Regression Splines). The process of training a model such as a decision tree is discussed in greater detail below with respect to FIG. 3. In some configurations, multiple decision trees or variants thereof, such as those of a random forest, may be learned. For example, multiple decision trees may be trained using appropriate training data, such as distinct decision trees for predicting adjustments to base color conversions between different pairs of color spaces, or for different genres (e.g., live action, animated, action, comedy, etc.), film franchises, etc.

In some configurations, the rule(s) in a function may also be re-learned as more examples of manual color conversions become available. In addition, the rule(s) may be tuned by, e.g., reinforcing rules that make correct predictions while adjusting the parameters of rules that make incorrect predictions.

Although rules and models are sometimes discussed herein as being distinct, in some configurations, the models may themselves include rules. In other configurations, only rules or only models may be used. That is, the color conversion adjustment module 114 may generally utilize any suitable rule(s) and/or model(s).

In some configurations, in lieu of or in additional to rules, the function(s) $210_i$ may include one or more deep learning models that are each conditioned on an input image and text. Deep learning models include artificial neural networks having multiple layers between an input and an output layer. Such deep learning models may be trained using, e.g., back-propagation with gradient descent or variants thereof, and any suitable loss function(s) may be minimized during the training under a loss minimization framework, such as manually-specified loss function(s) or automatically determined loss function(s). In particular, deep learning models may be trained using historical color conversion decisions that were made by hand (and in particular, manual adjustments to a base color conversion) as examples, and the deep learning models essentially learn to emulate such manual decisions made during color conversions of image frames (or regions therein) between the same color spaces and associated with the same metadata, such as image frames (or regions therein) from a film or episodic series by the same director, from the same genre, etc. Like the decision trees described above, multiple deep learning models may be trained using appropriate training data in some configurations, such as distinct deep learning models for color conversions between different pairs of color spaces, or for different genres (e.g., live action, animated, action, comedy, etc.), film franchises, or overall styles. As another example, distinct deep learning models may be trained to predict the creative decisions that different directors or film companies would make.

A generative adversarial network (GAN) and variants thereof are examples of deep learning architectures that may be conditioned on extra information, such as an input image and text. A GAN conditioned on extra information is also sometimes referred to as a "conditional GAN." A GAN may be implemented as a system of two artificial neural networks, a generative model that is trained to map inputs to a desired data distribution and a discriminative model that is trained to evaluate the probability that a sample came from training data rather than the generative model. The generative and discriminative models contest with each other in a zero-sum game framework in which the discriminative model encourages the generative model to create outputs indistinguishable from the desired data distribution domain. In one embodiment, the GAN that is conditioned on an input image and text may take as input a vector including noise as well as an image (including extracted image region(s) or a remaining image frame after a base conversion has been applied) and text (such as technical metadata, image characteristics metadata, objects metadata, and/or creative metadata information). In such a case, the generative model in the GAN may be trained to adjust base color conversions of images to color conversions that are predictive of what a human operator would choose for the same images, given the images themselves and the text, with the discriminative model encouraging the generative model to create output images similar to training images that provide examples of manual adjustments to base color conversions. Although discussed herein primarily with respect to conditional GANs, other suitable deep learning models (e.g., CNNs) or variants thereof may be used in conjunction with or in lieu of conditional GANs.

Although knowledge-based systems, decision trees, and deep learning models are described above as reference examples, alternative configurations may utilize other types of functions or combinations thereof. For example, the color conversion application 100 may use a nearest neighbors technique, such as the k-nearest neighbors algorithm. The k-nearest neighbors algorithm determines classification or regression outputs based on a measure of feature similarity (e.g., a distance function) to training examples. In one configuration, the color conversion application 100 may use the k-nearest neighbors algorithm or a variant thereof to determine, based on features of an image frame (determined from the image frame itself and/or associated metadata), a number of most similar examples of manual adjustments to base color conversions of image frames from an input to an output color space in a database of historical color conversion examples, and the color conversion application 100 may then take an average of the manual adjustments in the most similar examples and apply the average to the current base color conversion (of extracted image region(s) or remaining image frame). More generally, any functions suitable for solving the regression problem of predicting (1) specific adjustments such as to the brightness, saturation, and/or image that a director, colorist, or other individual would choose, and/or (2) output color values, based on an input image, information specified in associated metadata, and/or other information derived from the image or associated metadata, may be used. Although sometimes discussed herein with respect to regression outputs, in some embodiments functions may also be trained to output classifications, i.e., identified categor(ies), such as one of a number of predefined color mappings (e.g., LUTs or CTL algorithms).

Returning to FIG. 1, after the color conversion adjustment module 114 has adjusted the extracted image regions 110 of the base color conversion and the remaining image frames 112 to produce the adjusted extracted regions 116 and adjusted remaining image frames 118, an image combination module 120 combines the adjusted extracted regions 116 and the adjusted remaining image frames 118 into final image frames 122 that are output by the color conversion application 100. That is, the extracted image regions (whose base conversions have been adjusted by the color conversion adjustment module 114) are inserted back into the remaining image frames (whose base conversions have also been adjusted by the color conversion adjustment module 114), producing entire image frames 122 that are represented in the output color space and are output by the color conversion application 100.

In some configurations, the color conversion application 100 (or another application) may also receive and apply user edits to the automatically determined image frames 122. For example, a film studio may be contractually obligated to obtain a director's approval on all color conversions, and the director in such a case may be allowed to make manual edits to automatically determined color conversions. In one configuration, the color conversion application 100 (or another application) provides a user interface that may be displayed via a display device and allows users to preview automatically determined color conversions as well as to modify such conversions.

Figure 3:
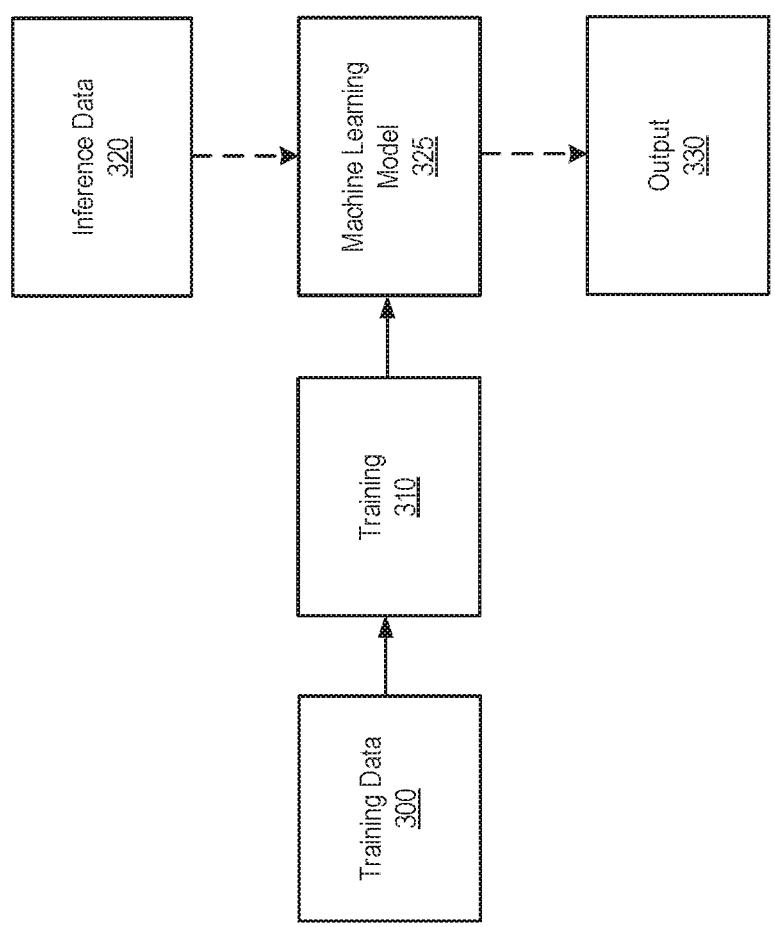
FIG. 3 illustrates the training and utilization of a machine learning model, according to an aspect of this disclosure.

FIG. 3 illustrates the training of a model 325 and inference using the trained model 325, according to an aspect of this disclosure. For example, the trained model 325 may be included in one of the functions $210_i$ described above. Although the training of a model 325 is shown for illustrative purposes, a model training application (such as the color conversion application 100 itself or another application) may generally obtain any number of functions including models and/or rules using machine learning training techniques. Distinct functions may be obtained using appropriate training data to, e.g., adjust base color conversions between different pairs of color spaces; predict decisions made by different directors or film companies during color conversions; predict decisions for different genres (e.g., live action, animated, action, comedy, etc.), film franchises, or overall styles; or for any other purpose.

As shown, training data 310 is first used to train the model 325 during a training phase 320. In one configuration, the training data 310 includes examples of manual adjustments to base color conversions between color spaces. Such training data may be obtained from, e.g., a database or library containing versions of past studio films and/or episodic series episodes represented in different color spaces. For example, to determine the manual adjustment to a base color conversion, a model training application may apply the base color conversion to convert the image frames of a video from one color space to another color space, and then compare the image frames after the base color conversion to a historical version of the image frames in the other color space that is stored in the database or library, in order to determine a color mapping or specific adjustments (e.g., to brightness, saturation, etc.) between the two. That is, adjustment(s) to brightness, saturation, image, etc. or a color mapping may be determined through reverse engineering the difference between original versions of historical image frames after the base color conversion is applied as a starting point and final versions of the same historical image frames in an output color space. Alternatively, the base color conversions and the historical version of the image frames may themselves be used as examples in the training data used to train, e.g., a deep learning model. Further, the training data that is used to train different models may include different manual adjustments to base color conversions. For example, a model being trained to predict adjustments to a base color conversion that would be made by a particular director, film company, genre, etc. may be trained using training data specific to the director, film company, genre, etc. Subsequent to training, additional inference data 330 is input into the trained model 325 during an inference phase to generate an output 340. The additional inference data 330 may include, e.g., base color conversions (of extracted image regions or remaining image frames) information in associated metadata, and/or other information derived therefrom, that are input into the trained model 325, which then generates the output 340 including, e.g., images (corresponding to the extracted image regions or remaining image frames) with colors predictive of what a human operator would have chosen, specific adjustments to make (to the brightness, saturation, etc. of the extracted image regions or remaining image frames), or a particular mapping between colors to apply (to the base conversion of the extracted image regions or remaining image frames). Although not shown, the training data 310 and the inference data 320 may also be prepared prior to being input into the machine learning model 225, such as by extracting features from the images themselves or associated metadata.

The training process at 320 may use any suitable training technique(s), and the particular technique(s) chosen will generally depend on the type of model (or rule) being trained. For example, back-propagation with gradient descent may be used to train a deep learning model. As another example, the ID3, C4.5, CART, CHAID, or MARS techniques described above may be used to train a decision tree. In some configurations, the training process at 320 uses a subset of the training data 310 to train the model 325, which is then evaluated using another subset of the training data 310. For example, a majority of the training data 310 may be used to train the model 325, and a remainder of the training data 310 used to evaluate the trained model 325. Evaluation of the trained model 325 may include validating that the model 325 performs sufficiently well in making predictions, such as producing predictions of adjustments from base color conversions that are less than a desired error from the manual adjustments to base color conversions in the evaluation data set. The goal of training is to obtain a model (or rule) capable of predicting what a user such as a director, colorist, or other individual would choose for image frames of a video being converted from one color space to another. Although one set of training data 310 is shown for illustrative purposes, additional training data (e.g., automatically determined color conversions that are later modified by a human operator) may also be used to re-train and improve a previously trained model.

As shown, the inference phase includes receiving inference data 330, which as described may be an image including, e.g., extracted image region(s) or a remaining image frame, as well as associated metadata, that the model 325 has not seen before and, assuming the model 325 is selected for use by the color conversion adjustment module 114, inputting the inference data 330 (after optionally preparing such data in the same manner the training data 310 was prepared) into the model 325. In turn, the model 325 generates the output 340, which as described may include an image (corresponding to the extracted image regions or remaining image frame) with adjusted pixel colors, specific adjustments to make (to the brightness, saturation, etc. of the extracted image regions or remaining image frames), or a particular mapping between colors to apply (to the base conversion of the extracted image regions or remaining image frames). The output 340 is predictive of what a director, colorist, or other individual would have chosen given the input received by the model 325. For example, the model 325 may be trained to predict an adjustment to a base color conversion that a specific director would make (using examples of historical examples of base color conversion adjustments by the director) for different genres, types of scenes, etc., and the color conversion adjustment module 114 may then process an image with metadata specifying the director and a particular genre, type of scene, etc. using the model 325 to obtain an output image predictive of what the director would have chosen for the particular genre, type of scene, etc.

Figure 4:
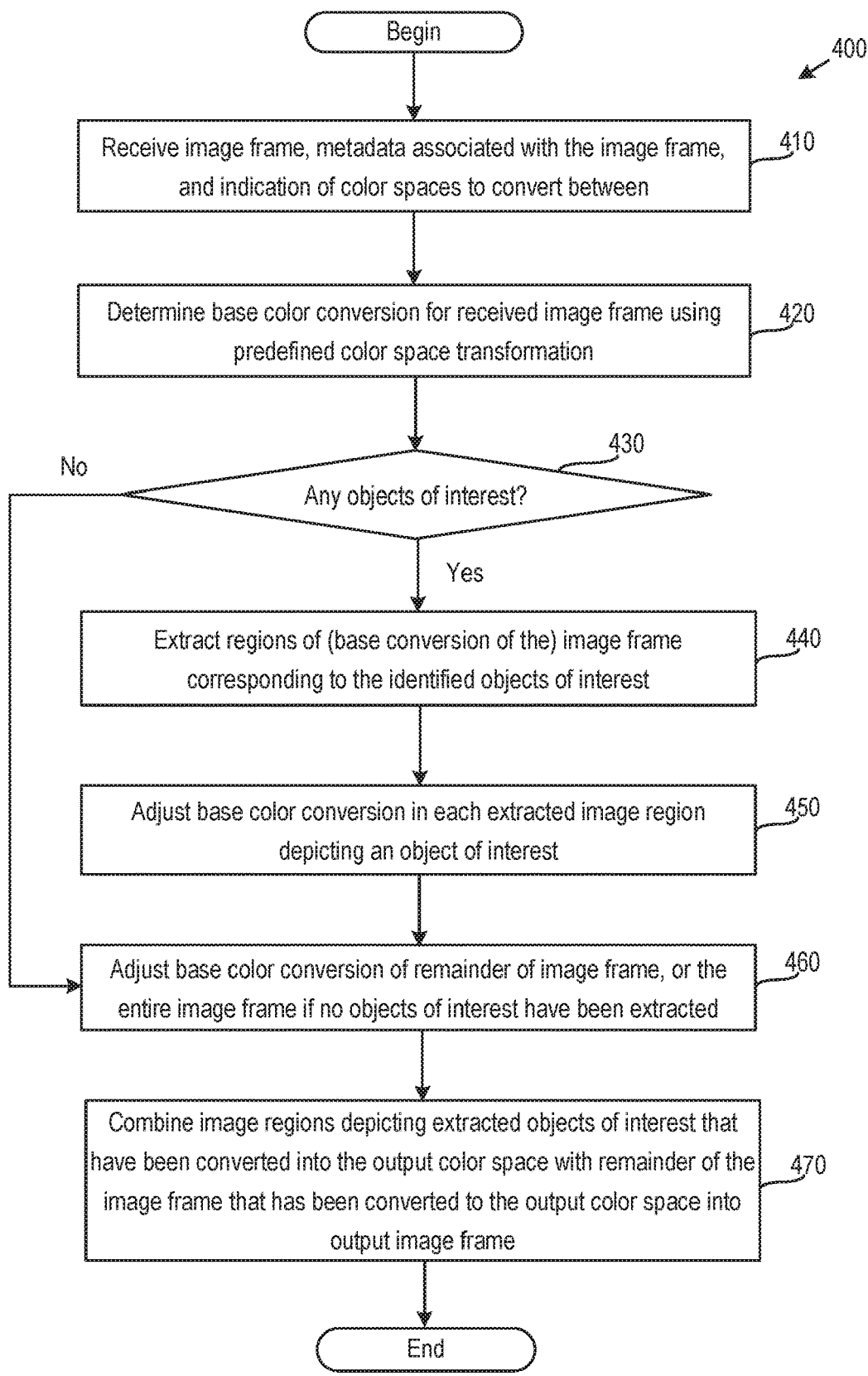
FIG. 4 illustrates a method of converting image frames from one color space to another, according to an aspect of this disclosure.

FIG. 4 illustrates a method 400 of converting image frames from one color space to another, according to an aspect of this disclosure. Although the method 400 is described with respect to actions performed by the color conversion application 100, it should be understood that the steps of the method 400 may actually be performed by components of the color conversion application 100 (e.g., the predefined color transformation module 104, the object detection module 108, the color conversion adjustment module 114, and the image combination module 120 described above), or more generally any system configured to perform the method steps, in any order, in some configurations.

As shown, the method 400 begins at step 410, where the color conversion application 100 receives an image frame, metadata associated with the image frame, and an indication of color spaces to convert between. Although discussed for exemplary purposes with respect to one image frame, it should be understood that the steps of the method 400 may be repeated to process multiple image frames, such as those of a film or episodic series episode. The received metadata may include technical metadata such as metadata indicating camera lenses used to capture the image frames, whether the image frames depict digital or film images, whether the image frames depict live action or animated content, a year, etc.; metadata indicating image characteristics such as day or night, bright or dark, contrast, saturation, grain, sharpness, etc.; metadata indicating objects (e.g., characters, creatures, props, environments, etc.) that have been automatically recognized or manually tagged in the image frames; and/or creative metadata indicating, e.g., a colorist, director, brand, genre, film company, episodic series, franchise, etc. associated with the image frames. Further, the metadata may be user-defined and/or automatically generated, by the color conversion application 100 itself and/or other application(s), using any suitable techniques, including those described above. The input and output color spaces may indicate, e.g., a conversion from the theatrical DCI-P3 color space to the in-home Rec. 709 color space or from the Rec2020 color space to the P3 D65 color space.

At step 420, the color conversion application 100 determines a base color conversion for the received image frame using a predefined color space transformation. The base color conversion may be obtained using, e.g., a LUT or a color space transformation in the form of a CTL program that is configured to convert pixel values in the color space of the received image frame into pixel values in the output color space. Such a base color conversion may be applied to convert the received image frame into an initial representation in the output color space.

At step 430, the color conversion application 100 (optionally) determines whether there are any objects of interest in the image frame. If the color conversion application 100 determines that there are objects of interest in the image frame, then the color conversion application 100 extracts regions of the (base conversion of the) image frame corresponding to the identified objects of interest at step 440. For example, one or more machine learning models (e.g., CNNs or SVMs) may be trained and then used to extract objects of interest that should be processed differently from the rest of an image frame, as described above.

At step 450, the color conversion application 100 adjusts the base color conversion in each extracted image region depicting an object of interest. In one configuration, the color conversion application 100 may select and apply an appropriate function, such as one of the functions $210_i$ described above, in order to adjust the base color conversion in each extracted image region. As described, each of the functions $210_i$ may include one or more rules and/or models, such as rules in a knowledge-based system, decision tree rules, or deep learning models, which may be obtained through appropriate machine learning training techniques (e.g., decision tree learning algorithms for decision trees, back-propagation with gradient descent for deep learning models, etc.). It should be understood that, in applying an appropriate function to adjust the base color conversion of each extracted image region, the function selected for an extracted image region may take as input the extracted image region itself, information specified in the associated metadata, and/other information derived from the image or associated metadata, which are also sometimes referred to herein as the input features. The function may then output an adjusted extracted image region, or the output of the function, such as specific adjustments to brightness, saturation, etc. or a specific color mapping, may be applied to the extracted image region to adjust it. The function may (or may not) also include user-defined rule(s), such as user-defined rules that are employed to check whether an automatically determined color conversion satisfies predefined expectations (and, if not, raise an alert to the user). Further, different functions may be applicable to different circumstances, such as color conversions between different color spaces, or for different genres (e.g., live action, animated, action, comedy, etc.), film franchises, etc., and the color conversion application 100 may select an appropriate function to use at step 450 based on, e.g., information specified in metadata associated with the extracted image region, which as described may be received along with the image frames from which image regions were extracted.

At step 460, the color conversion application 100 adjusts the base color conversion of the remainder of the image frame (i.e., the image frame minus the regions depicting the extracted objects of interest), or the entire image frame if no objects of interest have been extracted. Similar to the adjustment to the extracted image regions depicting objects of interest at step 450, the color conversion application 100 may select and apply an appropriate function including rule(s) and/or model(s) in adjusting the base color conversion of the remainder of the image frame.

At step 470, the color conversion application 100 combines the image regions depicting the extracted objects of interest that have been converted into the output color space with the remainder of the image frame that has been converted to the output color space into an output image frame. Step 470 can be skipped if no image regions depicting objects of interest are extracted, i.e., if the optional steps 430-440 are not performed. In some configurations, the color conversion application 100 (or another application) may also provide a user interface for users to make manual edits to automatically converted image frames.

Figure 5:
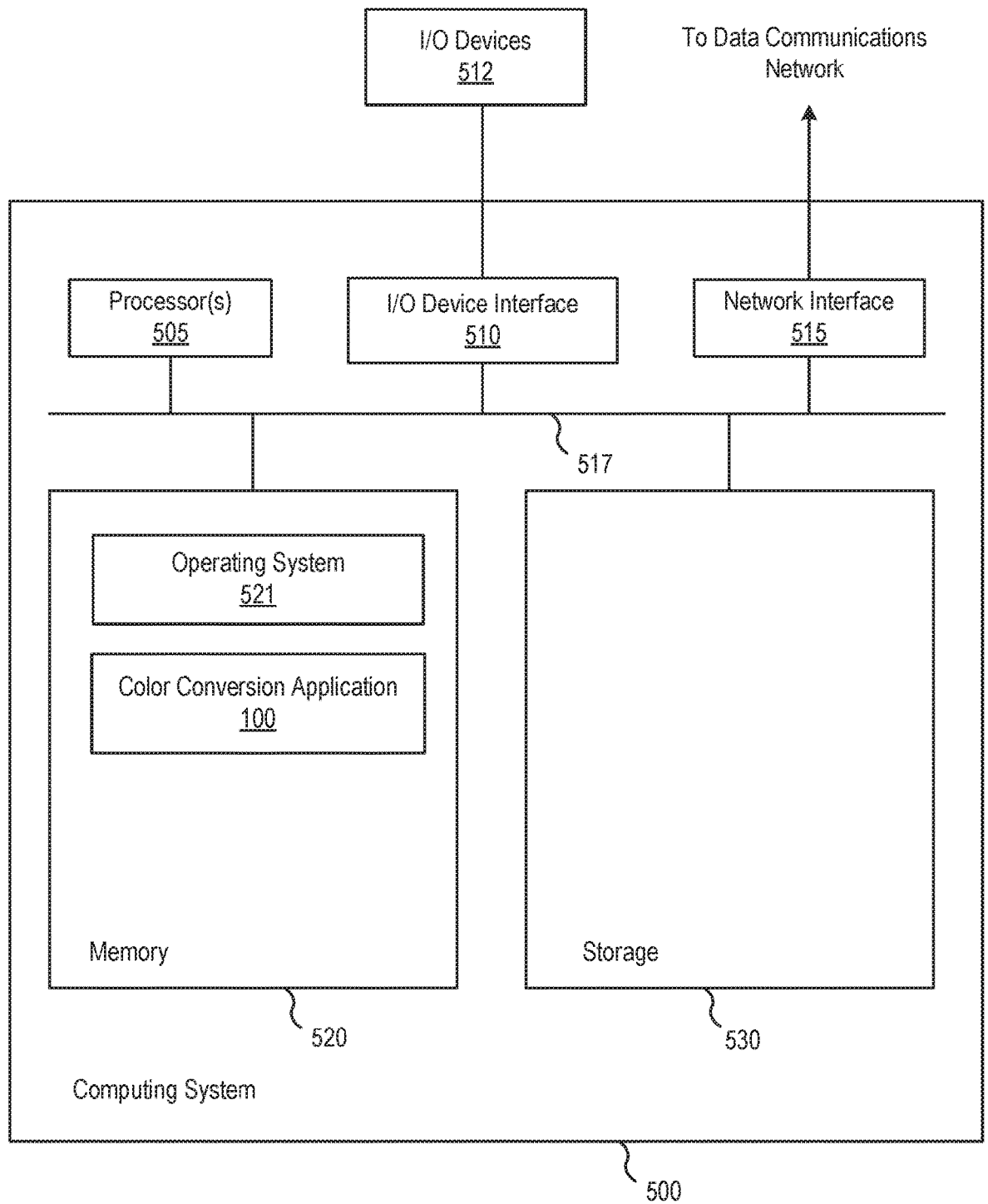
FIG. 5 illustrates a system in which an aspect of this disclosure may be implemented.

FIG. 5 illustrates a system 500 in which an aspect of this disclosure may be implemented. As shown, the system 500 includes, without limitation, a central processing unit (CPU) 505, a network interface 515 connecting the system 500 to a network 516, an interconnect 517, a memory 520, and storage 530. The system 500 also includes an I/O device interface 510 connecting I/O devices 512 (e.g., keyboard, display and mouse devices) to the system 500.

The CPU 505 retrieves and executes programming instructions stored in the memory 520. Similarly, the CPU 505 stores and retrieves application data residing in the memory 520. The interconnect 517 facilitates transmission, such as of programming instructions and application data, between the CPU 505, I/O device interface 510, storage 530, network interface 515, and memory 520. The CPU 505 is included to be representative of a single CPU, multiple CPUs, a single CPU having multiple processing cores, one or more graphics processing units (GPUs), a combination of such processors, and the like. And the memory 520 is generally included to be representative of a random access memory. The storage 530 may be a disk drive storage device. Although shown as a single unit, the storage 530 may be a combination of fixed and/or removable storage devices, such as magnetic disk drives, flash drives, removable memory cards or optical storage, network attached storage (NAS), or a storage area-network (SAN). Further, the system 500 is included to be representative of a physical computing system as well as virtual machine instances hosted on a set of underlying physical computing systems. Further still, although shown as a single computing system, one of ordinary skill in the art will recognized that the components of the system 500 shown in FIG. 5 may be distributed across multiple computing systems connected by a data communications network.

As shown, the memory 520 includes an operating system 521 and the color conversion application 100. The operating system 521 may be, e.g., Linux® or Windows®. The color conversion application 100 is configured to convert image frames of videos between color spaces. In one configuration, the color conversion application 100 may receive an image frame, metadata associated with the image frame, and an indication of color spaces to convert between; determine a base color conversion for the received image frame using a predefined color space transformation; (optionally) determine whether there are any objects of interest in the image frame and extract regions of the (base conversion of the) image frame corresponding to the identified objects of interest; adjust the base color conversion in each extracted image region depicting an object of interest; adjust the base color conversion of the remainder of the image frame, or the entire image frame if no objects of interest have been extracted; and combine the image regions depicting the extracted objects of interest that have been converted into the output color space with the remainder of the image frame that has been converted to the output color space into an output image frame, according to the method 400 described above with respect to FIG. 4.

Although discussed above primarily with respect to image frames such as those of a film or episodic series episode, techniques disclosed herein may also be used to convert individual images that do not belong to a film or episodic series episode between color spaces.

Although discussed above primarily with respect to determining and then adjusting a base color conversion, alternative configurations may not require a base color conversion to be performed. For example, functions may be used that include rules and/or modules trained via machine learning to take image frames (or extracted regions depicting objects of interest and remaining image frames) represented in one color space and directly output image frames (or the regions depicting objects of interest and remaining image frames) in another color space, without requiring a base color conversion.

Although discussed above primarily with respect to certain examples of metadata, in other configurations any other suitable information may be specified in the metadata associated with image frames. For example, the metadata may specify whether a scene includes direct sunlight or ambient light, whether a scene is indoors or outdoors, scene mood, etc.

Although discussed above primarily with respect to color conversions from one color space to another after a predefined color space transformation such as a LUT or CTL algorithm is applied, machine learning may also be used elsewhere in some configurations. For example, machine learning model(s) (e.g., a GAN) may be used in lieu of a LUT or CTL algorithm for the baseline color conversion that is then adjusted. As another example, the predictive techniques disclosed herein may be applied in production and/or post-production processes, such as to perform color corrections during the processing of raw camera footage that is shot to a final finished digital master, which may include converting image frames in raw or Logarithmic camera space(s) and captured across different shots in a film or episodic series episode to match themselves and/or to match other films, episodes, or series. A raw camera space is a native color space of an image as captured by a digital sensor prior to any signal processing that may be applied. Raw color formats are used to preserve as many details from the camera sensor as possible to provide the widest range of color decisions available during the digital intermediate (color correction) process. For a Logarithmic color space, in-camera signal processing may use a logarithmic luminance curve to preserve details in the highlights and shadows of a captured image to maintain as wide of a dynamic range (the luminance range between full black and spectral highlights (super-whites)) as possible. The predictive techniques disclosed herein may be used in the color correction of raw or Logarithmic color space image frames. In particular, functions including rule(s) and/or model(s) such as those described above may be used to learn and then predict color correction decisions that a user (e.g., a cinematographer or colorist) would make for image frames of a film or episodic series episode, based on previous decisions that were made for the same film or episode and/or different films, such as different films from the same franchise or by the same director, or different episodes of the same episodic series or across different episodic series, i.e., to predict the color correction decisions that a user would make during camera/lens matching in order to match the shots of a film or episodic series episode to themselves and/or to other films, episodes, or series. Such predictive techniques can improve the initial color correction process to create an essentially seamless view of content in which the image frames of a film, episodic series, or episode have a consistent set of looks. In some configurations, the predictive techniques may follow certain guidelines when predicting color correction decisions, such as maintaining linearity of an image. As yet another example, predictive techniques disclosed herein may be used in visual effects to emulate the same look of images captured with a particular camera and lens package.

Advantageously, techniques disclosed herein permit image frames, such as those of a film or episodic series episode, to be automatically converted from one color space to another while predicting the conversion decisions a director, colorist, or others would make. As a result, techniques disclosed herein may be employed to replace or assist color conversion trim passes that have traditionally been performed manually, thereby removing dependency on a, e.g., specific colorist or other individual to perform the color conversion. Doing so may also permit the relatively efficient and consistent creation of content represented in different color spaces, while meeting the expectations of directors, colorists, or other individuals whose historical decisions may have been used to train the machine learning model(s). Those directors, colorists, or other individuals may then be free to, e.g., spend more time editing the original version of a film or episodic series episode without having to work as much on derivative versions. Further, techniques disclosed herein permit the creation of various color space versions from a master color space version, reducing the number of uncompressed masters that need to be stored in long-term storage media. In addition, techniques are disclosed for making color corrections using machine learning in the production and/or post production processes.

The flowchart and block diagrams in the Figures illustrate the architecture, functionality, and operation of possible implementations of systems, methods and computer program products according to various aspects of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order or out of order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the foregoing is directed to aspects of the present disclosure, other and further aspects of this disclosure may be devised without departing from the basic scope thereof, and the scope thereof is determined by the claims that follow.

What is claimed is:

1. A computer-implemented method for converting image frames from a first color space to a second color space, the computer-implemented method comprising:
    receiving one or more image frames represented in the first color space, the one or more image frames being associated with creative metadata specific to the one or more image frames, the creative metadata indicating a genre and a scene type;
    performing a base color conversion of the one or more image frames into one or more initial converted image frames in the second color space via a color space transformation, wherein the first color space has a different gamut of colors than the second color space;
    extracting, from the one or more initial converted image frames and using a trained model, object regions depicting one or more objects of interest;
    adjusting, by operation of one or more computer processors and using a first function of a plurality of functions trained using machine learning, one or more colors of a first object region of the object regions based on the genre;
    adjusting, using a second function of the plurality of functions, one or more colors of a second object region of the object regions based on the scene type, wherein the second function is distinct from the first function; and
    combining the object regions and a remainder of the one or more initial converted image frames to generate for output one or more final converted image frames in the second color space.

2. The computer-implemented method of claim 1, wherein the creative metadata further indicates at least one of a camera lens used to capture the one or more image frames, whether the one or more image frames depict digital or film images, whether the one or more image frames depict live action or animated content, a year, image characteristics, the one or more objects of interest, a colorist, a director, a brand, a film company, an episodic series, or a film franchise.

3. The computer-implemented method of claim 1, wherein the scene type indicates at least one of whether the one or more image frames include daytime or nighttime scenes, whether scenes depicted in the one or more image frames are indoors or outdoors, or moods of one or more scenes depicted in the one or more image frames.

4. The computer-implemented method of claim 1, wherein the one or more objects of interest include at least one of one or more characters, one or more creatures, one or more props, or one or more environments.

5. The computer-implemented method of claim 1, wherein the color space transformation uses a look-up table (LUT) ora color space transformation language (CTL) program.

6. The computer-implemented method of claim 1, wherein the plurality of functions includes at least one of a rule in a knowledge-based system, a decision tree, a deep learning model, or a k-nearest neighbors algorithm.

7. The computer-implemented method of claim 1, further comprising receiving and applying at least one user edit to the one or more final converted image frames.

8. The computer-implemented method of claim 1, wherein the first color space is a raw color space, a Logarithmic color space, or a combination thereof.

9. A non-transitory computer-readable medium including instructions executable to convert image frames from a first color space to a second color space, by performing operations comprising:
    receiving one or more image frames represented in the first color space, the one or more image frames being associated with creative metadata specific to the one or more image frames, the creative metadata indicating a genre and a scene type;
    performing a base color conversion of the one or more image frames into one or more initial converted image frames in the second color space via a color space transformation, wherein the first color space has a different gamut of colors than the second color space;
    extracting, from the one or more initial converted image frames and using a trained model, object regions depicting one or more objects of interest;
    adjusting, by one or more computer processors and using a first function of a plurality of functions trained using machine learning, one or more colors of a first object region of the object regions based on the genre;
    adjusting, using a second function of the plurality of functions, one or more colors of a second object region of the object regions based on the scene type, wherein the second function is distinct from the first function; and
    combining the object regions and a remainder of the one or more initial converted image frames to generate for output one or more final converted image frames in the second color space.

10. The non-transitory computer-readable medium of claim 9, wherein the creative metadata further indicates at least one of a camera lens used to capture the one or more image frames, whether the one or more image frames depict digital or film images, whether the one or more image frames depict live action or animated content, a year, image characteristics, the one or more objects of interest, a colorist, a director, a brand, a film company, an episodic series, or a film franchise.

11. The non-transitory computer-readable medium of claim 9, wherein the one or more objects of interest include at least one of one or more characters, one or more creatures, one or more props, or one or more environments.

12. The non-transitory computer-readable medium of claim 9, wherein the color space transformation uses a look-up table (LUT) or a color space transformation language (CTL) program.

13. The non-transitory computer-readable medium of claim 9, wherein the first color space includes a wider gamut of colors than the second color space, wherein the first color space is a raw color space, a Logarithmic color space, or a combination thereof.

14. A system, comprising:
    one or more computer processors; and
    a memory containing a program that, when executed on the one or more computer processors, performs an operation for converting image frames from a first color space to a second color space, the operation comprising:

receiving one or more image frames represented in the first color space, the one or more image frames being associated with creative metadata specific to the one or more image frames, the creative metadata indicating a genre and a scene type;

performing a base color conversion of the one or more image frames into one or more initial converted image frames in the second color space via a color space transformation, wherein the first color space has a different gamut of colors than the second color space;

extracting, from the one or more initial converted image frames and using a trained model, object regions depicting one or more objects of interest;

adjusting, using a plurality of functions trained using machine learning, one or more colors of a first object region of the object regions based on the genre;

adjusting, using a second function of the plurality of functions, one or more colors of a second object region of the object regions based on the scene type, wherein the second function is distinct from the first function; and combining the object regions and a remainder of the one or more initial converted image frames to generate for output one or more final converted image frames in the second color space.

15. The computer-implemented method of claim 1, further comprising:

adjusting the remainder of the one or more initial converted image frames using at least a third function trained using machine learning, wherein the third function is different from the plurality of functions.

16. The computer-implemented method of claim 1, wherein the color space transformation does not account for the creative metadata and does not use machine learning.

17. The computer-implemented method of claim 1, wherein the first color space corresponds to a color space in which the one or more image frames are depicted in a theater, and wherein the second color space corresponds to a color space in which the one or more image frames are depicted on an in-home display.

18. The computer-implemented method of claim 1, wherein the trained model comprises a convolutional neural network or a support vector machine.

19. The computer-implemented method of claim 1, wherein the plurality of functions comprises a conditional generative adversarial network that includes a generative model and a discriminative model.

20. The computer-implemented method of claim 1, wherein the object regions are represented in the second color space both before and after adjustment.

21. The computer-implemented method of claim 1, wherein the creative metadata further indicates image characteristics, wherein the image characteristics include at least one of whether the one or more image frames are bright or dark, whether the one or more image frames were captured with direct sunlight or ambient light, a contrast, a saturation, a grain, or a sharpness.

* * * * *

UNITED STATES PATENT AND TRADEMARK OFFICE
CERTIFICATE OF CORRECTION

PATENT NO. : 11,158,286 B2
APPLICATION NO. : 16/356840
DATED : October 26, 2021
INVENTOR(S) : Yazmaliza Yaacob et al.

Page 1 of 1

It is certified that error appears in the above-identified patent and that said Letters Patent is hereby corrected as shown below:

In the Claims

In Column 17, Line 64, in Claim 5, delete "ora" and insert -- or a --.

Signed and Sealed this
Twenty-ninth Day of March, 2022

Drew Hirshfeld
*Performing the Functions and Duties of the
Under Secretary of Commerce for Intellectual Property and
Director of the United States Patent and Trademark Office*